March 22, 1960     E. E. LEWIS ET AL     2,929,212
COOLING MEANS FOR FLUID ACTUATORS
Filed March 28, 1957
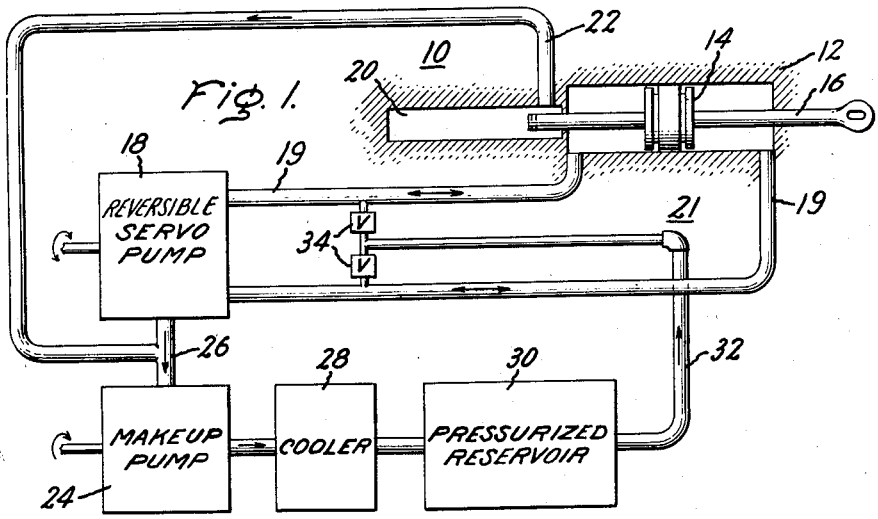
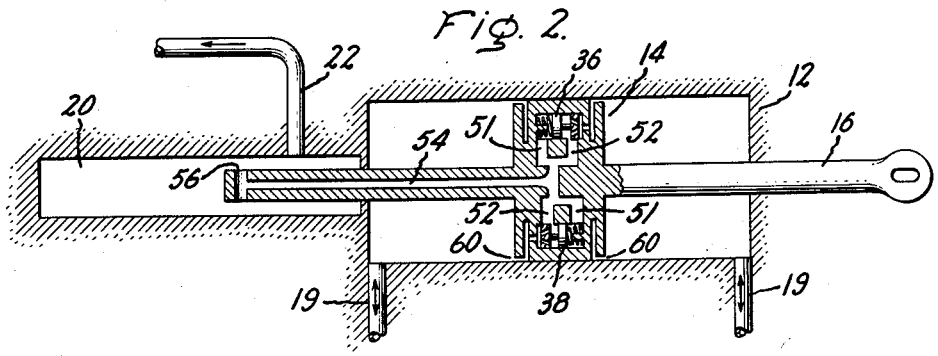
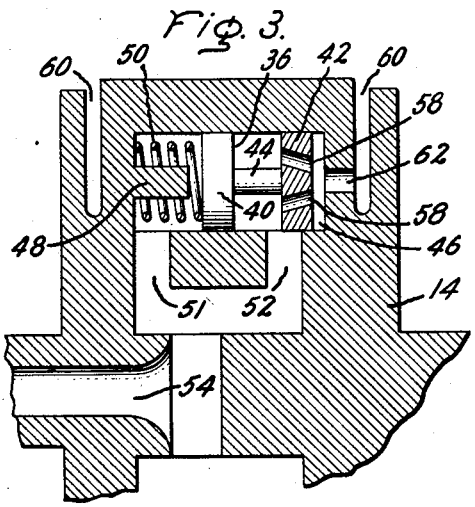
Inventors:
Ernest E. Lewis,
John R. Granan,
by Ros. D McBurnett
Their Attorney

United States Patent Office 2,929,212
Patented Mar. 22, 1960

2,929,212
COOLING MEANS FOR FLUID ACTUATORS

Ernest E. Lewis and John R. Granan, Scotia, N.Y., assignors to General Electric Company, a corporation of New York Application March 28, 1957, Serial No. 649,085

6 Claims. (Cl. 60—52)

The present invention relates to cooling means for fluid control systems and more particularly to cooling means providing a continuous cooling flow through a fluid actuator.

It is common knowledge that high speed aircraft and missile operation often imposes unique stringent requirements on fluid control systems and their components, such as hydraulic actuators. For example, one of these stringent requirements which must be satisfied is the moving and holding of loads under conditions of high ambient and fluid temperatures. Particularly with static or slow moving loads there exists the definite possibility of fluid stagnations and attendant overheating which brings about instability problems or serious system or fluid breakdowns. These particular problems are aggravated in some applications, by conditions which result in the generation of gases within the fluid components, such as actuators, or lines.

It is already known that cooling schemes depending on flow through a fixed orifice in a piston head which connects both sides of an actuator are not reliable for substantially all ranges of operation. As can be surmised, the flow rate through fixed orifices will vary with the differential pressure across the piston. Accordingly, at zero load no differential pressure exists and the fluid will become virtually stagnant.

The present invention provides means for allowing continuous cooling flow through a fluid component, such as an actuator, and simultaneously provide for continuous removal of entrapped air, gases or vapor. It will become obvious that the application of the present invention extends from supersonic missiles to such applications as glass furnaces, or atomic reactor controls, or the like. Specifically, the present invention provides means for allowing fluid flow through a piston under all conditions of loading and for zero loading by means of an induced flow through the fluid system maintained at all times by having the suction line of a make-up fluid pump at a lower pressure than the pressure in a pressurized fluid reservoir.

In this manner, the cooling rate is independent of load and of the pressure since as the pressure goes up, the valve within the piston is adapted to close to a predetermined amount but is never completely turned off. The present system will also provide cooling during stall conditions, wherein the load is held stationary. Briefly, the present invention comprises a piston incorporating a number of oppositely acting internal spring biased valves which allow a continuous fluid flow therethrough for all operational positions of the piston.

An object of the present invention is the provision of a high performance servo system for allowing continuous cooling flow through a fluid component, such as an actuator.

Another object is to provide means for having a continuous cooling flow through a fluid actuator and for continuous removal of gaseous matter entrapped therein.

A further object of the invention is the provision of a fluid control system for moving and holding loads under conditions of high ambient and fluid temperatures.

A still further object of the invention is the provision of a fluid control system wherein with static or slow moving loads the possibility of fluid stagnation and attendant overheating, with the resultant generation of gases, is eliminated.

Other objects and many of the attendant advantages of this invention will be readily appreciated as the same becomes better understood by reference to the following detailed description when considered in conjunction with the accompanying drawing in which like reference numerals designate like parts throughout the figures thereof and wherein:

Figure 1 is a schematic view of a preferred embodiment of the present invention;

Figure 2 is a sectional view of a portion of the preferred embodiment shown in Figure 1, illustrating the coaction of two spring-loaded flow regulating valves with the piston of the fluid actuator; and Figure 3 is a sectional view, exaggerated for purposes of illustration, of one of the spring-loaded flow regulating valves utilized in the preferred embodiment.

Referring now to the drawings, there is illustrated a preferred embodiment 10 comprising an actuator 12 having a piston head 14 slideably coacting therein and having an integral piston rod 16. A servo pump 18 is provided in the embodiment 10 for supplying fluid to control the rate and direction of movement of the actuator 12 through servo lines 19.

One end of the actuator 12 is provided with a drain chamber 20 operatively coacting with the actuator through the piston rod 16, hereinafter described. The drain chamber 20 is provided with a drain conduit 22 which is connected to the suction side of a makeup pump 24 through a suction line 26, which also couples the servo pump 18 to the makeup pump. Since the servo pump is reversible whereas the makeup pump is not, they will be generally driven by different driving units as indicated by the separate arrowed shafts in Figure 1.

The makeup pump 24 discharges through a conventional fluid cooler 28 into a pressurized fluid reservoir 30. The reservoir is coupled by a conduit 32 to a number of check valves 34 which are operatively connected to the lines 19 of a servo 21 which includes the actuator 12 and the servo pump 18. The conventional check valves 34 are pressure responsive so that whichever side of the servo 21 is the low pressure side, the flow will be directed thereto.

Figures 2 and 3 illustrate the specific structural details associated with spring-loaded flow regulating valves 36 and 38 mounted in the piston head 14. The valves are identical but reversed in location relative to the servo 21 to provide continuous cooling flow through the actuator 12. Each valve is provided with lands 40 and 42 parallel to each other and spaced by a valve stem 44. Each valve is operatively located within a valve chamber 46 for relative axial displacement therein. One end of the chamber 46 is formed with an axial projection 48 provided with a spring 50 coaxially mounted thereabout for predeterminedly biasing the valve therein.

The valve chamber 46 is formed with outlet conduits 51 and 52 provided with a common drain conduit 54 located within the piston rod 16. In this manner, the fluid is drained through the valves into the drain chamber 20 through radial outlets 56 perpendicular to the drain conduit 54 and located on the end of the piston rod axially slideable within the drain chamber. It will be obvious that the construction of the flow regulating valve 38 is similar to the valve 36 in structure and function, and that the fluid flow therethrough will be from the other side of the servo 21 than that through the valve 36. Also, the equivalent structure in both valves is indicated by similar numerals.

Land 42 of the valve 36 or 38 is provided with a number of apertures 58 with each having an axis at an askew angle relative to the axis of the valve stem 44. The apertures cooperate at all actuator pressure conditions with a valve inlet 62, at one end of the valve chamber 46 to allow a free flow through the valves to the metering orifice formed by the land 42 and the outlet conduit 52. The magnitude of the metering orifice is a function of the pressure within the actuator 12.

The piston head 14 is further formed with axially spaced peripheral grooves 60 at each end thereof. The end portions of the piston head, adjacent to the grooves, are each formed with a diameter somewhat less than the diameter of the center portion of piston head, which contains the regulating valves 36 and 38. With this type of piston head construction the grooves 60 serve to collect any entrapped gaseous fluid within the actuator 12 since gases cling to the inner peripheral surface of the actuator. Hence, any gas within the actuator will be accumulated in the grooves 60 by the normal operational axial movement of the piston head 14 and the associated continuous flow through the system.

In the operation of the actuator 12 of the preferred embodiment 10, the two similar spring-loaded flow regulating valves 36 and 38, integrally mounted within the piston head 14, are operatively situated so that each valve communicates with one side of the piston head. However, both valves discharge into the common drain 54 provided within one portion of the piston rod 16. Pressure in either end of the actuator 12, regulated by the servo pump 18, reacts on the differential area of the corresponding flow regulating valve and is resisted by the spring 50 set to a predetermined value, which would be a function of the particular installation at hand.

At full line pressure assuming for purposes of illustration that this pressure is to the right of the piston head 14 in Figure 2, the valve 36 strikes the axial projection 48 which prevents complete closure of the drain conduit 52 by the land 42. This minimum opening between the land 42 and the drain conduit 52 in either of the valves 36 and 38 will pass sufficient fluid to obtain the desired rate of cooling at full line pressure. At lower pressures than full line pressure, the springs 50 operate to increase the opening between the land 42 and the drain conduit 52 by axially biasing, for example, the valve 36 to the right of Figure 3. In this manner, the increased metering orifice opening maintains substantially constant flow, thus providing substantially constant cooling rate which is independent of load conditions.

The peripheral grooves 60 integral with the piston head 14 serve as collectors for entrapped gases, or the like, which, in turn, pass out through the drain 54 by the continuous constant fluid flow and are removed at an external location, in any of a number of conventional manners. Thus, the peripheral grooves 60 permit a flushing out of gaseous fluid by the constant fluid flow from the actuator 12 and thereby eliminate any system instability resulting from the presence of entrapped gases therein.

In the operation of the entire system of the preferred embodiment 10, the servo pump 18 supplies fluid through the servo lines 19 to the actuator 12 to control the rate and direction of movement of the piston head 14 slideably located therein. The cooling flow through both valves 36 and 38 is continuous since the lands 42 do not completely close the valve inlets 62 at any low pressure conditions and flow exists at all times through the apertures 58. Accordingly, the cooling flow and the leakage from the servo pump 18 is directed through suction line 26 to the suction side of the makeup pump 24. The makeup pump discharges at a predeterminedly higher pressure, than at the inlet thereof, to the conventional type of fluid cooler 28 and, in turn, into the pressurized reservoir 30. From the reservoir, the fluid flows through the conduit 32 back into the servo lines 19 through the respective check valve 34 controlling the flow into the low pressure side of the servo that there is an induced flow through the preferred embodiment at all times. It is clear that the servo comprises the actuator 12, the servo pump 18 and the connecting servo lines 19.

Accordingly, the present invention provides and maintains a continuous cooling flow under all conditions of load and/or pressure, since as the pressure goes up within the actuator 12, the coacting valve 36 or 38 will be axially actuated so that the metering orifice between the lands 42 and the drain conduit 52 becomes smaller. It should be apparent from Figure 1, that when the actuator 12 has no load, the pressures on either side of the piston head 14 are equal to that in the pressurized reservoir 30. This pressure, however, is greater than that existing at the suction side or inlet of the makeup pump 24. Consequently, there will be continuous circulation from the pressurized reservoir 30 to both of the check valves 34 and actuator 12, and back through the drain conduit 22, along with the leakage from the servo pump 18, through suction line 26 to the suction side of the makeup pump 24.

Briefly, the present invention provides fluid actuator cooling means wherein the principle is applicable to all type of actuators, linear or rotary, and wherein the cooling rate is independent of load and/or pressure. Further, as disclosed in the preferred embodiment 10, cooling is also provided during stall conditions, wherein a load is held stationary, and, of course, provision is also made for removal of entrapped air, gases, or vapors. In general, the present invention presents a high performance system with continuous cooling flow which is compact, simple to maintain, and consisting of reliable hydraulic components which minimizes the possibility of system failures.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A fluid control system comprising an actuator having a piston head axially slideable therein and servo means for controlling the movement thereof, a drain chamber coaxially and operably connected with said actuator, a piston rod operatively fixed to said piston head and having an interior conduit in one portion thereof, a number of oppositely acting spring-load flow regulating valves mounted within said piston head, inlet means integral with said piston head for operatively coupling each end of said actuator with a respective regulating valve, a drain conduit connected to said drain chamber, said interior conduit operatively coupled to each of said regulating valves and to said drain chamber for drainage to said drain conduit, a make-up pump having a pressure differential between the inlet and outlet thereof, a pressurized reservoir hydraulically coupled to the high pressure outlet of said pressure differential, said pressurized reservoir hydraulically coupled to said servo means to maintain continuous flow to said actuator.

2. A fluid control system comprising an actuator having a piston head slideably coacting therein with an integral piston rod connected thereto, said piston rod having conduit means coupling said piston head with one end thereof, a servo pump hydraulically coupled to both ends of said actuator for supplying fluid thereto for controlling the rate and direction of movement of said piston head, said servo pump having changeable low and high pressure sides operating dependent on the desired direction of movement of said piston head, a drain chamber juxtaposed to said actuator and operatively coupled thereto by said conduit means, drain conduit means operatively coupled to said drain chamber, a make-up pump having a high pressure outlet and a low pressure inlet, said inlet coupled to said drain conduit and to said servo pump, a pressurized fluid reservoir hydraulically coupled to said high pressure outlet and hydraulically coupled to said actuator for directing flow to the low pressure side of said servo pump, a plurality of flow regulating valve means within said piston head continuously coupling said actuator to said conduit means and, in turn, to said drain chamber.

3. Cooling means for a fluid control system comprising a fluid actuator, a servo means operatively coupled to said actuator for supplying fluid flow therethrough, a differential pressure source operatively coupled to said fluid actuator and to said servo means, flow regulating valve means operatively mounted within said actuator and coupled to said differential pressure source for supplying continuous flow therethrough independent of load and pressure to thereby prevent overheating, and means coupled to said actuator and to said differential pressure source maintaining the continuous flow.

4. Hydraulic means to provide a continuous cooling flow comprising a fluid actuator, a piston head operatively mounted within said actuator, at least two valve means within said piston head, one of said valve means being hydraulically coupled to only one side of said piston head, another of said valve means being hydraulically coupled only to the opposite side of said piston head, drain means within said piston head operatively coupled to each of said valve means, said valve means being partially open at all times so as to provide cooling flow therethrough under all conditions of loading and pressure.

5. Flow regulating valve means adapted for mounting within a piston head comprising a valve chamber, inlet means at one end of said chamber, valve means having two lands axially slideable within said valve chamber, one of the lands of said valve means having a plurality of axially askew apertures therein operatively coupled to said inlet means, spring means biasing said valve means to maintain a continuous flow through said inlet means and said apertures, drain means operatively connected with said inlet means and said apertures to maintain a cooling flow rate therethrough independent of load and pressure.

6. Cooling means for a hydraulic system comprising a hydraulic actuator, a piston head operatively mounted within said actuator, a plurality of oppositely acting spring-loaded flow regulating valves mounted within said piston head, each of said valves coupled to a respective side of said piston head for continuous flow therethrough, drain means operatively connected with said actuator, a piston rod integrally fixed to said piston head and coupling each of said valves to said drain means, valve stop means fixed to said piston head and operable with each of said valves to prevent complete elimination of the flow therethrough, gas entrapping means fixed at each end of said piston head and operatively coupled with each of said valve means for passing gaseous fluid therethrough to said drain means.

References Cited in the file of this patent
UNITED STATES PATENTS

| | | |
|---|---|---|
| 2,462,580 | Watson | Feb. 22, 1949 |
| 2,659,204 | Conway et al. | Nov. 17, 1953 |
| 2,688,313 | Bauer | Sept. 7, 1954 |
| 2,778,339 | Mancusi | Jan. 22, 1957 |